April 12, 1949.　　　　W. HUBER　　　　2,467,129
APPARATUS FOR MAKING SUSTAINED
LOAD RUPTURE TESTS Filed July 30, 1943　　　　　　　　　　3 Sheets-Sheet 1

INVENTOR
WALTER HUBER
BY
ATTORNEYS

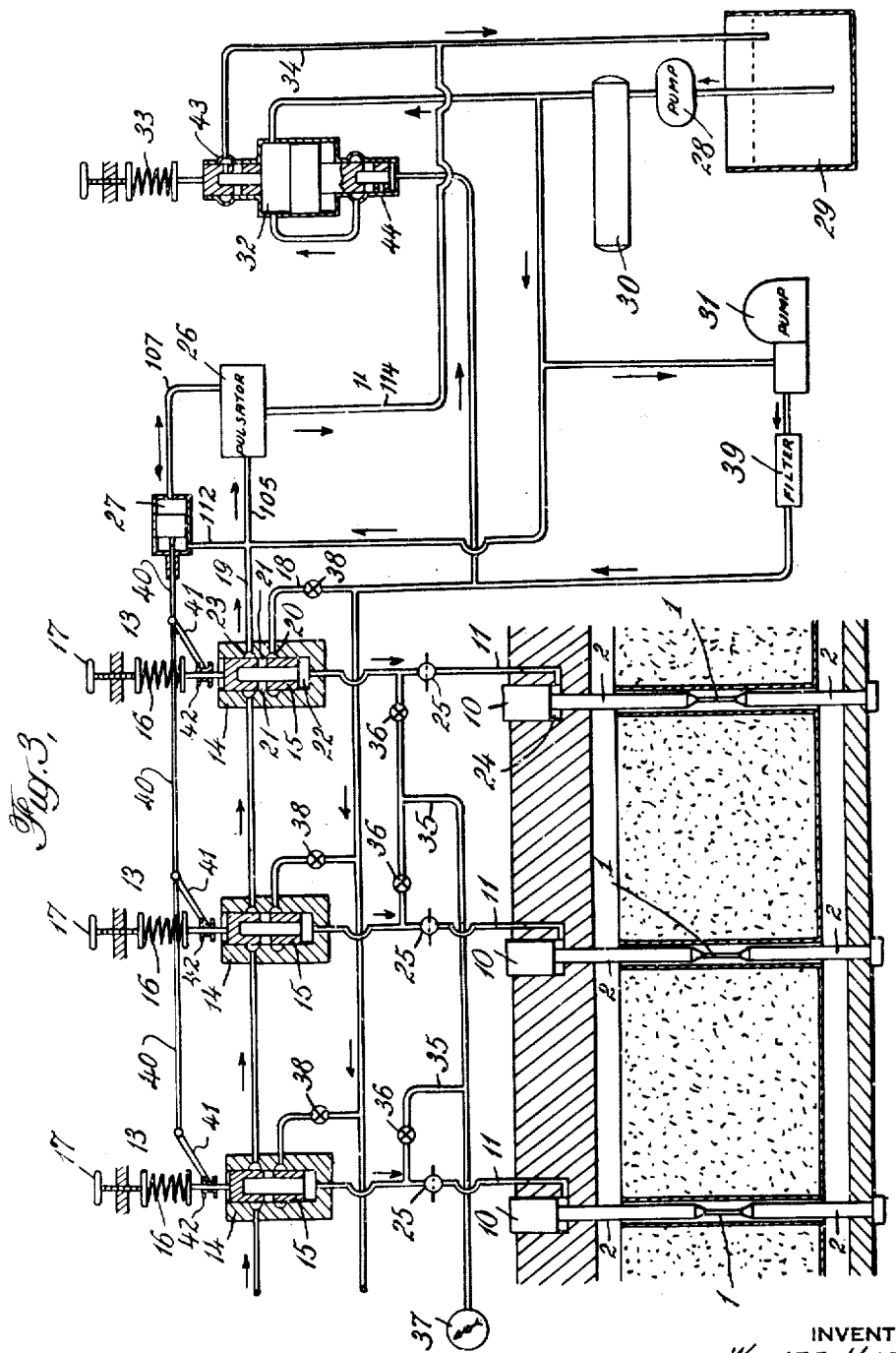

April 12, 1949.  W. HUBER  2,467,129
APPARATUS FOR MAKING SUSTAINED
LOAD RUPTURE TESTS
Filed July 30, 1943  3 Sheets-Sheet 3
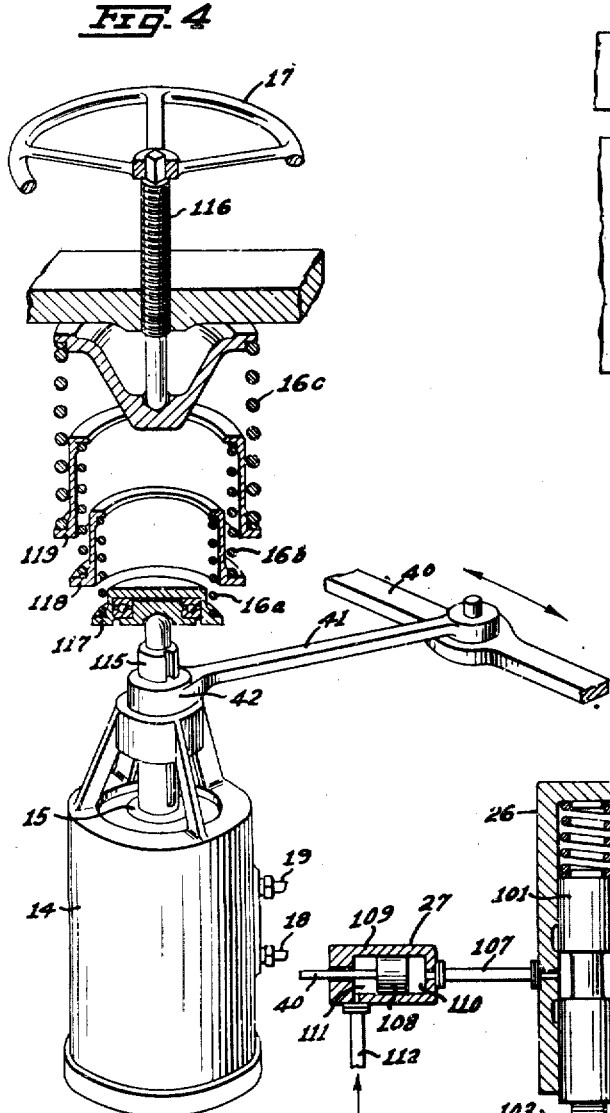
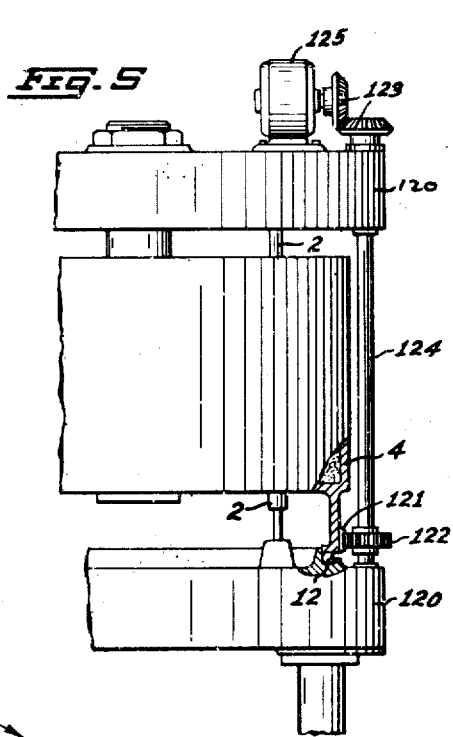
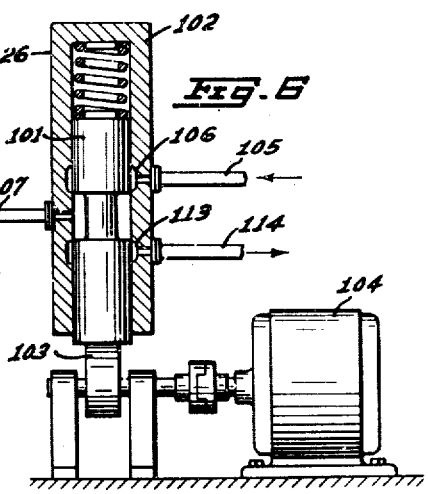
INVENTOR.
Walter Huber
BY
Pennie, Edmonds, Morton and Barrows
ATTORNEYS Patented Apr. 12, 1949

2,467,129

UNITED STATES PATENT OFFICE 2,467,129

APPARATUS FOR MAKING SUSTAINED LOAD RUPTURE TESTS

Walter Huber, Winterthur, Switzerland, assignor to Sulzer Freres, Societe Anonyme, Winterthur, Switzerland Application July 30, 1943, Serial No. 496,839
In Switzerland July 18, 1942

Section 1, Public Law 690, August 8, 1946
Patent expires July 18, 1962

7 Claims. (Cl. 73—15.6)

The invention relates to an apparatus for making sustained load rupture tests, particularly on several testpieces at high temperatures and under simultaneous loading, such loading remaining preferably unchanged for a long period of time. It consists in that the loading is applied hydraulically, a testpiece can be loaded by a liquid under pressure, the pressure being determined by a regulating member connected to an hydraulic pressure system, this regulating member interrupting the connection between the liquid causing the loading and the rest of the hydraulic system, when the load on the testpiece is uniform.

It is already known to employ machines for exerting a pressure or tension on a testpiece hydraulically when making strength tests. With such methods of testing, however, it is not at all necessary that the load should be kept constant over a lengthy period of time. On the contrary, the load in most cases increases continually, or varies according to some desired law.

Hydraulic loading has the great advantage that also when using standard testpieces 10 mm. in diameter, these can be placed comparatively close to each other, for instance with a distance 70 mm. between them, so that even an apparatus for testing a considerable number of bars simultaneously is not unreasonably large. The invention makes it possible, not only to keep the load on each individual testpiece constant to within 1% at some particular value and during the whole time of testing, but also excludes the possibility of the changes occurring in any testpiece having an effect on the others. In connection with this it is also particularly important to be able to adjust the load with essentially the same accuracy over the whole range from its highest possible value down to about 10% of that or even less.

The results of investigations will be much more valuable when it is possible to obtain a uniform distribution of the temperature over the whole length of testpiece. Hitherto an endeavour has been made to effect this by means of adjustable resistances in parallel with the heating coils. This solution is, however, rather complicated and correspondingly expensive. According to the invention, such a uniform distribution of temperature is obtained by arranging the heating coils at the most partly beside the testpieces and preferably leaving their middle parts free. In so far as the emission of heat through the testpiece itself cannot be kept small enough by suitable insulation, so that along the bar a fall of temperature would nevertheless occur, a suitably dimensioned additional winding can be provided to compensate for that emission of heat.

Summing up, the invention consists in an apparatus for carrying out sustained load rupture tests on a number of test pieces simultaneously at high temperature under an individually constant load, comprising means for fixing one end of each of the pieces to be tested, a piston for each test piece operating in a cylinder, a separate means connecting the other end of each test piece to its piston, a hydraulic pressure system comprising pumping and liquid distributing means and regulating members connected to the latter for regulating the supply and the flowing-off of liquid to each piston in order to apply to each piston the desired constant pressure to provide the desired individual load on each test piece, and heating means to maintain the test pieces at uniform temperature.

One example of the invention is shown diagrammatically in the drawings, in which:

Fig. 3 illustrates diagrammatically the layout of a possible form of hydraulic pressure system for the invention;

Fig. 4 is a perspective view, partly in section, illustrating a possible detailed construction of the upper portion of an individual regulating assembly from Fig. 3 on a larger scale;

Fig. 5 is a perspective view, partly in section, illustrating possible means to rotate the insulating jacket shown in Figs. 1 and 2; and Fig. 6 is an elevation, partly in section, of the pulsator and motor assembly from Fig. 3.

Figure 1:
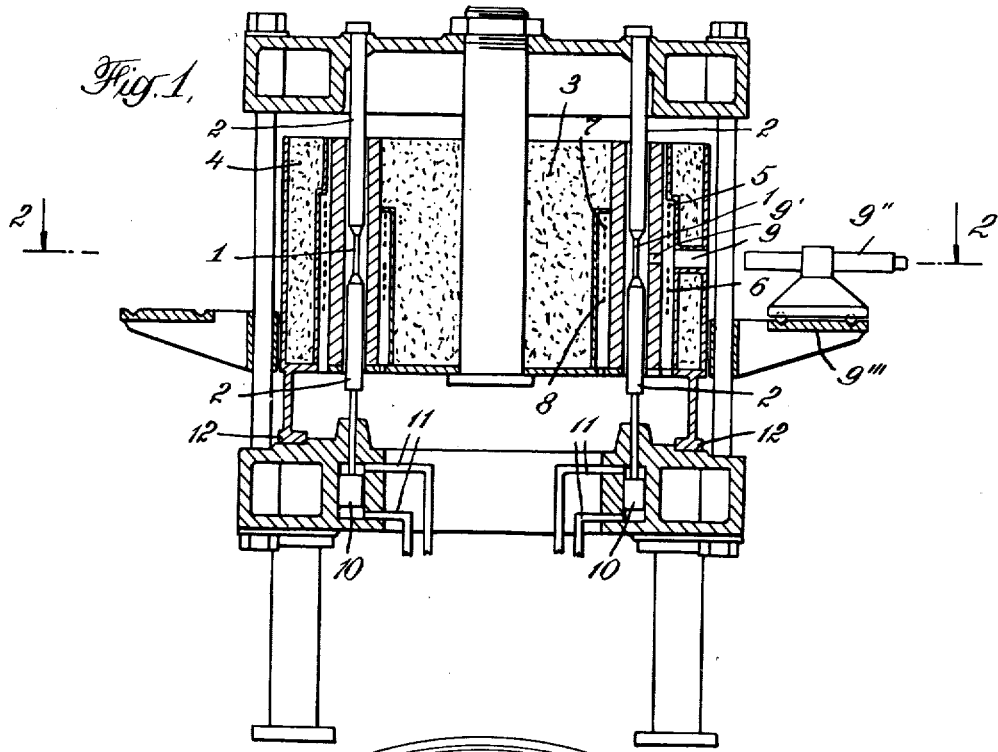
Fig. 1 shows a vertical section through a device according to the invention.
Figure 2:
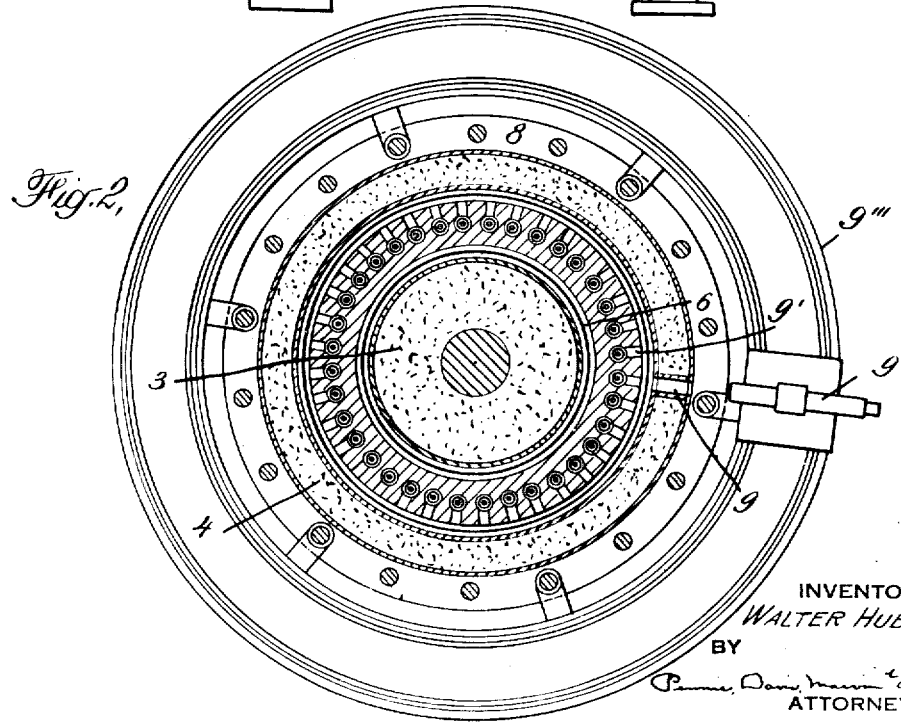
Fig. 2 is a cross-section on the plane 2—2 of Fig. 1.

In all figures each particular reference number refers to the same object.

The testpieces are marked 1, the bars to which the testpieces are fixed, for instance by screwing, are marked 2. 3 is the inner and 4 the outer insulating jacket, 5 and 6 the upper and lower heating coils, and 7 and 8 the corresponding heating coils. For observing the changes in the testpieces one or more windows 9 are provided. The liquid under pressure from the regulating assemblies 13 is led to the pressure pistons 10 through the pipes 11.

In order to reduce heat losses as far as possible, the insulating material 4 has preferably only one window 9. Nevertheless, to allow all testpieces to be observed, the insulating jacket 4 is rotatably mounted on bearings 12, so that the window or windows can be brought in front of any particular testpiece 1. In order to reduce the influence of the window as much as possible, a device can be provided which keeps the insulating jacket slowly turning during the time when no readings are taken. Such a device is illustrated in Fig. 5 in which the insulating jacket 4 is provided near bearing 12 with a circumferential rack 121 which engages pinion 122. Shaft 124 carries pinion 122 and is journalled top and bottom in frame 120. Motor 125, by means of gears 123, rotates shaft 124 at an appropriate speed. In order also to avoid local cooling when the insulating jacket is at rest, the window can be provided with a heating coil. An optical instrument 9" serving to observe the test piece 1 is rotatably mounted on the outer periphery of the device 9'" in such a way that each bar can be observed through it.

As can be seen from Fig. 3, the regulating assembly 13 consists in a cylinder 14, with a piston 15 arranged therein, which is influenced by a spring 16 adjustable by means of adjusting assembly 17. Through the pipes 18 and 19, the regulating device is in connection with the hydraulic pressure system, which may have two stages, for instance. This hydraulic pressure system can be common to all or one part of the regulating members. The system is adjusted to a particular pressure by changing, with the help of the device 17, the pressure of the spring 16 acting on the piston 15.

If for example the pressure acting on the pistons 10 is to be increased, the pressure of the spring 16 is increased. In consequence of that, the piston 15 moves downwards, so that through the opening 20 in the wall of the cylinder 14 and the opening 21 in the piston, liquid under pressure can flow into the cylinder space 22. The pressure in the cylinder space 22 now rises so that the piston 15 moves upwards again against the pressure of the spring 16 until the opening 21 of the piston 15 is opposite the closed cylinder wall and the piston 15 is in its position of rest. In that position the loading fluid is shut off from the other hydraulic pressure system.

If the pressure of the spring 16 is diminished, the piston 15 moves upwards so that the opening 21 is connected to an opening 23 in the cylinder wall, after which loading fluid from the cylinder space 22 flows away through the opening 23 into the part of the outer hydraulic pressure system which is under lower pressure, until the spring 16 brings the piston 15 back again into its position of rest, in consequence of the decreasing pressure in the cylinder space 22. The opening 21 may be exactly as wide as the space between the openings 20 and 23, so that the slightest displacement of the piston connects the opening 21 to one of the openings 20, 23.

Although, as can be seen from Fig. 3, in this position the volume of liquid transmitting the pressure to the working piston 10 is quite separated from the other hydraulic pressure system, it is still possible—for instance in consequence of the rotation of the respective testpiece, or through losses, or through the connecting of a pressure gauge, etc.—for quite small pressure fluctuations to arise, which are at once eliminated by the regulating member. For instance, if the pressure decreases in the cylinder space 22, the pressure of the spring 16 becomes preponderant, thus causing a small displacement of the piston 15 downwards, so that liquid under pressure at once flows into the space 22, the original pressure is restored again and the piston is brought back into its position of rest.

In consequence of the liquid contained in the cylinder space 22, in the pipe 11 and in the working cylinder 24, being quite shut in by operation of the regulating assembly 13, it is impossible for the load on the test pieces to influence each other, for instance because of automatic regulation, arbitrary changing of the pressure, or pressure fluctuations occurring in the common hydraulic pressure system.

The pipe 11 is provided with a throttle 25, by means of which, should a testpiece break and thus cause a sudden drop of pressure in the cylinder 24, the back flow of pressure liquid and the fall of pressure in the cylinder space 22 is slowed down as much as possible, thus preventing any fall of pressure in the outer hydraulic system. In a particularly simple manner, even pipe 11 itself can be used for the throttling by its internal diameter being kept very small.

It is preferable to keep the diameter of the pistons 10 as small as possible, in order that the testpieces may be arranged as close to each other as possible. In order to be able to exert a sufficiently great pull in spite of the pistons 10 being small, a comparatively high liquid pressure is necessary. In accordance with this, the spring 16 suitable for the maximum load must be comparatively strong. It is, however, known that with such springs it is not possible to adjust their force with great accuracy when they are loaded only with a small percentage of their maximum load.

In order, nevertheless, to obtain an accuracy of adjustment which is practically uniform over the whole range of loading coming into question, the regulating member 13 may be, as shown in detail in Fig. 4, provided with several springs 16a, 16b, 16c, which are of different strengths and come into action one after the other through the telescoping action of spring guides 117, 118, and 119 as the load is increased by means of adjusting device 17 turning screw thread 116. In this way, at low loads only a weak spring 16a acts on the piston 15 through rod 115, so that even at this low load very accurate adjustment of the pressure is possible. The number of steps can be increased as found desirable, and the accuracy of pressure arranged to be practically uniform over the whole range of loading. The result of using a set of springs of different strengths is that a displacement of the piston 15 by a certain amount over the whole regulating range causes a change in loading which is practically uniform.

To insure that the regulating assembly 13 comes into action even at extremely small fluctuations in pressure the pistons 15 are set in alternating rotary motion which is produced by means of the hydraulic motor 27. The fluid pressure produced by the low-pressure pump 28 acts upon the smaller surface of the piston in motor 27, while the larger surface of this piston is subjected alternately to the pressure porduced by the low-pressure pump 28 and the lower pressure prevailing in the drain pipe 34 by means of the pulsator 26. As shown in Fig. 6, the pulsator 26 consists of a piston valve 101 which is periodically reciprocated in the cylinder 102. This movement is produced by means of an eccentric 103 which is driven by a geared electric motor 104 at, for instance, 200 R. P. M. The liquid under pressure introduced through the pipe 105 from the intermediate pressure system (fed by pump 28, Fig. 3) flows into an annular space 106. This annular space is periodically brought into connection with pipe 107. The hydraulic motor 27 has a piston 108 which can move in a cylinder 109. The cylinder space 110 is connected to the pipe 107, while the cylinder space 111 is connected to the pipe 112, which in its turn is connected with the same intermediate pressure system as pipe 105. When pipe 105 is connected with pipe 107 through the annular space 106, the pressure in the cylinder space 110 and 111 is the same. Since the piston area exposed to this liquid pressure at the side facing cylinder space 111 is smaller by the cross-section area of the piston rod than the side facing the cylinder space 110, the piston is moved to the left. With the periodic movement of the valve 101, the pipe 107 is temporarily connected through the annular passage 113 with the outlet pipe 114. The pressure in the cylinder space 110 then becomes less than that in the cylinder space 111. The piston 108 is thus moved to the right. The reciprocating motion of the piston 108 is transmitted through the piston rod 40, which is linked by means of the hub 42 of the crank rod 41 to the regulating piston 15, thus giving the latter a rotary motion. For this purpose, the cranks 41 are coupled with the piston 15 in such a manner, that a torque is transmitted without impairing the longitudinal motions of the pistons 15. In order that the crank rods 41 effecting the rotary motion of piston rods 15 do not at the same time exert any radial forces on them tending to bind, the hubs 42, by which rods 41 are attached to rods 15, are guided centrally on the cylinder casing 14.

As shown in Fig. 3 the low-pressure pump 28 draws fluid out of the tank 29 and delivers it through the cooler 30 to the high-pressure pump 31 and to the pulsator 26 and the rocking piston 27. The fluid delivered in excess by the low-pressure pump 28 flows into the accumulator 32 and, after a pressure dependent on the setting of the spring 33 has been exceeded, flows out of this through the opened valve 43 and the pipe 34 into the vessel 29. The high-pressure pump 31 delivers liquid through one or more filters 39 and valves 38 to the regulating members 13. The surplus fluid supplied by the high-pressure pump 31 is conducted under the control valve 44 of the accumulator, so that this valve overcomes the action of the spring 33 and moves upwards. In this way the surplus pressure fluid can flow back through the accumulator space 32, the opened valve 43 and the pipe 34 into the vessel 29.

The valve 38 serves to stop the further flow of liquid under pressure to any particular regulating member, if the respective testpiece should break. A pressure gauge 37 common to all testpieces is preferably connected through valve 36 to the pipes 11. In order to prevent the change of conditions at one testpiece affecting the other testpieces, a further valve can be provided, to allow the liquid under pressure in the pipe to the pressure gauge to flow away before a new measurement is taken. The valve 36 can for the same purpose be made with only a very narrow passage through it.

In order that the pistons can be quickly and easily moved when taking out and putting in testpieces, valves—not shown in the drawings—may be fitted also to the pipes 11; by means of these valves the liquid present in the pipe 11 can be led back to the vessel 29.

I claim:

1. Apparatus for carrying out sustained load rupture tests on several pieces simultaneously at high temperature and for a long time under an individually constant load which comprises means for holding one end of each of several pieces to be tested, a piston for each test piece operating in a cylinder, a separate means connecting the other end of each test piece to said corresponding piston, a hydraulic pressure system comprising a pump, liquid distributing means and regulating means interposed between said liquid distributing means and said pistons for applying to each piston the desired constant pressure to provide the desired load on each test piece, and heating means to maintain the test pieces at a uniform temperature.

2. Apparatus according to claim 1 in which the regulating means include valve means, spring means acting on said valve means and means for adjusting the force of the action of said spring means.

3. Apparatus for carrying out sustained load rupture tests on several pieces simultaneously at high temperature and for a long time under an individually constant load which comprises means for holding one end of each of several pieces to be tested, a piston for each test piece operating in a cylinder, a separate means connecting the other end of each test piece to said corresponding piston, a hydraulic pressure system for applying to each piston the desired constant pressure to provide the desired constant load on each test piece comprising a pump, liquid distributing means and a regulating assembly connecting said liquid distributing means to each piston comprising a spring-loaded, slide valve interposed between said liquid distributing means and said piston for regulating the supply of liquid to said piston, means for imparting alternating rotary motion to said slide valve to make it responsive to small fluctuations in the hydraulic pressure in the system, and heating means to maintain the test pieces under a uniform temperature.

4. Apparatus for carrying out sustained load rupture tests on several pieces simultaneously at high temperature and for a long time under an individually constant load which comprises means for holding one end of each of the several pieces to be tested, a piston for each test piece operating in a cylinder, a separate means connecting the other end of each test piece to said corresponding piston, a hydraulic pressure system for applying to each piston the desired constant pressure to provide the desired constant load on each test piece comprising a pump, liquid distributing means and a regulating assembly connecting said liquid distributing means to each piston comprising a spring-loaded, slide valve interposed between said liquid distributing means and said piston for regulating the supply of liquid to said piston, means for imparting alternating rotary motion to said slide valve to make it responsive to small fluctuations in the hydraulic pressure in the system, heating means to maintain the test pieces under a uniform temperature and an insulating member surrounding the test pieces and heating means.

5. Apparatus for carrying out sustained load rupture tests on several pieces simultaneously at high temperature and for a long time under an individually constant load which comprises means for holding one end of each of the several pieces to be tested, a piston for each test piece operating in a cylinder, a separate means connecting the other end of each test piece to said corresponding piston, a hydraulic pressure system for applying to each piston the desired constant pressure to provide the desired constant load on each test piece comprising a pump, liquid distributing means and a regulating assembly connecting said liquid distributing means to each piston, comprising a spring-loaded, slide valve interposed between said liquid distributing means and said piston for regulating the supply of liquid to said piston, means for imparting alternating rotary motion to said slide valve to make it responsive to small fluctuations in the hydraulic pressure in the system, heating means to maintain the test pieces under a uniform temperature, said test pieces being arranged in an annular row, an annular insulating member surrounding the test pieces and heating means, a window in the annular member for observing one test piece at a time, and means to rotate the annular member to bring the test pieces into view one after another.

6. Apparatus for carrying out sustained load rupture tests on several pieces simultaneously at high temperature and for a long time under an individually constant load which comprises means for holding one end of each of the several pieces to be tested, a piston for each test piece operating in a cylinder, a separate means connecting the other end of each test piece to said corresponding piston, a hydraulic pressure system comprising a pump and liquid distributing means for applying to each piston the desired individually constant pressure to provide the desired load on each test piece, said test pieces to be arranged in an annular row, means for applying a uniform and constant amount of heat to the test pieces, a rotatably mounted annular member spaced outside the test pieces, at least one window in the annular member, and means to rotate the annular member to bring the test pieces into view through the window.

7. Apparatus for carrying out sustained load rupture tests on several pieces simultaneously at high temperature and for a long time under an individually constant load which comprises means for holding one end of each of several pieces to be tested, a piston for each test piece operating in a cylinder, a separate means connecting the other end of each test piece to said corresponding piston, a hydraulic pressure system comprising a pump and liquid distributing means for applying to each piston the desired constant pressure to provide the desired load on each test piece, said test pieces being arranged in an annular row, means for applying a uniform and a constant amount of heat to the test pieces, a rotatably mounted annular member spaced outside the test pieces, at least one window in the annular member, means to rotate the annular member to bring the test pieces into view through the window, an optical sighting device, and means for mounting the said optical sighting device for rotation around the annular member, whereby said sighting device may be moved to any desired position to view a test piece through the window.

WALTER HUBER.

REFERENCES CITED

The following references are of record in the file of this patent:

UNITED STATES PATENTS

| Number | Name | Date |
|---|---|---|
| 1,650,736 | Zelov | Nov. 29, 1927 |
| 1,888,755 | Barr et al. | Nov. 22, 1932 |
| 2,154,280 | Nadai et al. | Apr. 11, 1939 |
| 2,167,328 | Beggs | July 25, 1939 |

FOREIGN PATENTS

| Number | Country | Date |
|---|---|---|
| 467,599 | Great Britain | June 21, 1937 |